(12) United States Patent
Kim

(10) Patent No.: US 12,382,153 B2
(45) Date of Patent: Aug. 5, 2025

(54) CAMERA MODULE

(71) Applicant: SAMSUNG ELECTRO-MECHANICS CO., LTD., Suwon-si (KR)

(72) Inventor: Tae Hoon Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 277 days.

(21) Appl. No.: 18/109,964

(22) Filed: Feb. 15, 2023

(65) Prior Publication Data

US 2024/0107139 A1    Mar. 28, 2024

(30) Foreign Application Priority Data

Sep. 28, 2022    (KR) ........................ 10-2022-0123188

(51) Int. Cl.
| | |
|---|---|
| *H04N 23/52* | (2023.01) |
| *G02B 7/02* | (2021.01) |
| *G02B 27/00* | (2006.01) |
| *H04N 23/55* | (2023.01) |

(52) U.S. Cl.
CPC ............. *H04N 23/52* (2023.01); *G02B 7/021* (2013.01); *G02B 27/0006* (2013.01); *H04N 23/55* (2023.01)

(58) Field of Classification Search
CPC ........ H04N 23/52; H04N 23/55; G02B 7/021; G02B 27/0006
USPC ....................................................... 348/374
See application file for complete search history.

(56) References Cited

U.S. PATENT DOCUMENTS

| | | | |
|---|---|---|---|
| 6,731,867 B1 * | 5/2004 | Sherwin | G03B 11/00 396/25 |
| 2015/0036037 A1 | 2/2015 | Reed | |
| 2018/0210161 A1 | 7/2018 | Park et al. | |
| 2020/0103646 A1 | 4/2020 | Han et al. | |
| 2021/0103120 A1 | 4/2021 | Lee | |

FOREIGN PATENT DOCUMENTS

| | | |
|---|---|---|
| JP | 2006-11175 A | 1/2006 |
| KR | 10-2015-0041409 A | 4/2015 |
| KR | 10-2017-0006724 A | 1/2017 |
| KR | 10-2019-0110270 A | 9/2019 |
| KR | 10-2020-0037634 A | 4/2020 |
| KR | 10-2021-0049650 A | 5/2021 |

OTHER PUBLICATIONS

Korean Office Action issued on Jun. 27, 2024, in counterpart Korean Patent Application No. 10-2022-0123188 (12 pages in English, 8 pages in Korean).

* cited by examiner

*Primary Examiner* — Joel W Fosselman
(74) *Attorney, Agent, or Firm* — NSIP Law

(57) ABSTRACT

A camera module, may include: a lens module including a forwardmost lens disposed closest to an object: a housing configured to accommodate the lens module; a heater formed on the forwardmost lens, and configured to heat the forwardmost lens by a first driving signal; and a dirt remover formed on the forwardmost lens, and configured to generate electrical vibrations or mechanical vibrations or a voltage difference to remove dirt attached to a surface of the forwardmost lens by a second driving signal.

19 Claims, 18 Drawing Sheets

CAMERA MODULE

CROSS-REFERENCE TO RELATED APPLICATIONS

This application claims the benefit under 35 USC § 119(a) of Korean Patent Application No. 10-2022-0123188, filed on Sep. 28, 2022, in the Korean Intellectual Property Office, the entire disclosure of which is incorporated herein by reference for all purposes.

BACKGROUND

1. Field

The following description relates to a camera module.

2. Description of Related Art

A camera module may be mounted on, as an example, a vehicle, or the like, and may provide information that is necessary for vehicular operation or vehicular security. For example, a camera module that is mounted on a vehicle may be configured to provide traffic information that is necessary for autonomous driving of the vehicle. As another example, a camera module that is mounted on a vehicle may be configured to provide image information of people who are driving other vehicles that may impact the subject vehicle, or may provide information related to individuals who are attempting to trespass into the subject vehicle without permission.

However, since the camera module that is configured to perform this operation may be mounted on a vehicle in a form that is exposed to outside air, there may be a problem in that frost, or similar environmental elements, may be easily formed on a surface of the forwardmost lens, or rainwater may be easily formed on the surface of the forwardmost lens.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a lens module comprising a forwardmost lens: a housing configured to accommodate the lens module; a heater formed on the forwardmost lens, and configured to heat the forwardmost lens based on a first driving signal; and a dirt remover formed on the forwardmost lens, and configured to generate at least one of electrical vibrations, mechanical vibrations, and a voltage difference to remove particles attached to a surface of the forwardmost lens based on a second driving signal, wherein the heater and the dirt remover are formed as a single electrode pattern layer on the surface of the forwardmost lens.

The forwardmost lens may be a lens that is disposed closest to an object.

The heater may be formed in an edge region of the forwardmost lens, and the dirt remover may be formed in a paraxial region of the forwardmost lens.

The heater may include a heating unit formed in an edge region of the forwardmost lens; and a heating terminal connected to the heating unit.

The dirt remover may include a first electrode member which extends in a first direction, intersecting an optical axis of the forwardmost lens; a second electrode member formed to be parallel to the first electrode member; a first terminal connected to a first end of the first electrode member; and a second terminal connected to a first end of the second electrode member.

The first electrode member and the second electrode member may be alternately disposed in a second direction, intersecting the optical axis.

The heater and the dirt remover may be formed on an object-side surface of the forwardmost lens.

The camera module may further include a hydrophobic coating layer formed on a surface of the forwardmost lens.

The camera module may include an anti-reflection layer formed on a surface of the forwardmost lens.

The camera module may further include a refractive index correction member formed on a surface of the forwardmost lens, and may be configured to correct a change in transmittance and a change in reflectance of light caused by the heater and the dirt remover.

The heater may be formed in a region having a size of 10% to 40% of a total area, based on an outer surface, of the forwardmost lens, and the dirt remover may be formed in a region having a size of 60% to 90% of the total area.

In a general aspect, a camera module includes a lens module; a curved protective glass panel disposed on an object-side surface of the lens module; a heater formed on the protective glass panel, and configured to heat the protective glass panel based on a first driving signal; and a dirt remover formed on the protective glass panel, and configured to generate at least one of electrical vibrations, mechanical vibrations, and a voltage difference to remove particles attached to a surface of the protective glass panel based on a second driving signal.

The heater and the dirt remover may be formed on one surface of the protective glass panel.

The camera module may include a hydrophobic coating layer formed on the surface of the protective glass panel.

The camera module may include an anti-reflection layer formed on the surface of the protective glass panel.

The camera module may include a refractive index correction member formed on the surface of the protective glass panel, and configured to correct a change in transmittance of light caused by the heater and the dirt remover.

In a general aspect, a camera module includes a lens module, comprising a plurality of lens: a transparent electrode disposed on an object-side surface of a forwardmost lens of the plurality of lens; a hydrophobic coating layer formed on the object-side surface of the forwardmost lens; and a refractive index correction member disposed adjacent to the transparent electrode; wherein the transparent electrode comprises a heater and a dirt remover, and a formation region of the dirt remover is greater than a formation region of the heater.

The transparent electrode may include Indium Tin Oxide (ITO).

The camera module may further include an anti-reflection layer disposed between the transparent electrode and the hydrophobic coating layer.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
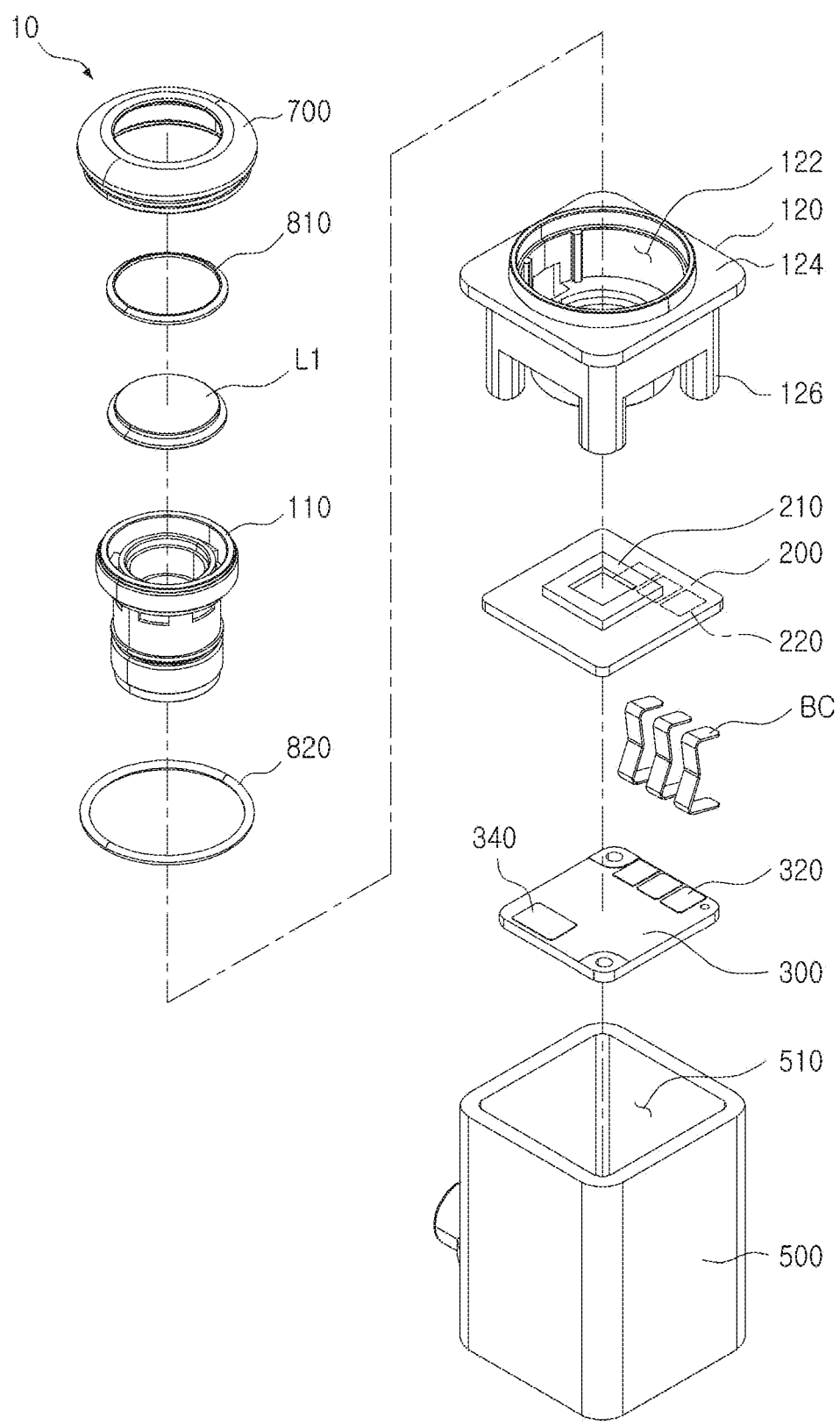
FIG. 1 illustrates an exploded perspective view of an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In an example, the camera module described herein may be configured to be mounted on a transport device. For example, the camera module, in accordance with one or more embodiments, may be mounted in a form of a camera for front and rear monitoring, or a camera for autonomous driving in a car, truck, cargo vehicle, fire truck, forklift, or the like. However, the scope and examples of implementation of the example camera module are not limited to the above devices. For example, the camera module may be mounted in a form of a camera for image capture, such as a surveillance drone, a transport drone, or the like.

An example camera module, in accordance with one or more embodiments, may be configured to remove frost, dirt, water, and similar elements that are formed or attached to the foremost lens. For example, the camera module, in accordance with one or more embodiments, may include a heater and a dirt remover that are formed on the forwardmost lens. The heater may be configured to remove moisture such as, but not limited to, frost, water droplets, and the like, that is formed on the surface of the foremost lens. For example, the heater may be configured to heat and evaporate water droplets that are formed on the surface of the forwardmost lens. The dirt remover may be configured to remove water droplets, dirt, and the like, attached to the surface of the forwardmost lens, from the central portion of the forwardmost lens. For example, the dirt remover may separate water droplets and dirt attached to the surface of the forwardmost lens from the surface of the forwardmost lens using electrical vibrations, mechanical vibrations, or a voltage difference, or may move the same toward an edge of the forwardmost lens.

An example camera module, in accordance with one or more embodiments, may include a protective glass panel configured to protect the forwardmost lens from external impacts. Additionally, the example camera module, in accordance with one or more embodiments, may be configured to remove frost, dirt, and similar elements that are formed or attached to the protective glass panel. For example, the example camera module, in accordance with one or more embodiments, may include a heater and a dirt remover that are formed on the protective glass panel. The heater may be configured to remove moisture such as frost, water droplets, and similar elements that are formed on a surface of the protective glass panel. For example, the heater may be configured to heat and evaporate water droplets formed on the surface of the protective glass panel. The dirt remover may be configured to remove water droplets, dirt, and similar elements, that are attached to the surface of the protective glass panel, from the center of the protective glass panel. In an example, the dirt remover may separate water droplets and dirt attached to the surface of the protective glass panel from the surface of the protective glass panel based on electrical vibrations, mechanical vibrations, or a voltage difference, or may move the same toward an edge side of the protective glass panel.

One or more examples relate to a camera module that is configured to remove dirt, water droplets, and similar particles or elements, that are attached to a surface of a forwardmost lens.

One or more examples may provide a camera module that is configured to minimize the phenomenon of deterioration in optical performance caused by frost, raindrops, and the like.

Since the camera modules according to the first and second aspects configured as described above may remove frost, water droplets, dirt, and similar particles or elements, which may impair imaging quality, the shape and position of an object to be imaged may be accurately imaged.

An example camera module, in accordance with one or more embodiments, will be described with reference to FIGS. 1 to 7.

An example camera module 10, in accordance with one or more embodiments, includes a lens barrel 110, a barrel holder 120, a first substrate 200, a second substrate 300, and a housing 500. However, the configuration of the camera module 10 is not limited to the members described above. In an example, the camera module 10 may further include a cover member 700 and airtight members 810 and 820.

The lens barrel 110 may be configured to include a plurality of lenses. For example, the lens barrel 110 may include four or more lenses, sequentially disposed in an optical axis from an object side. However, the number of lenses accommodated in the lens barrel 110 is not limited to four. For example, the number of lenses accommodated in the lens barrel 110 may be increased to 5 or more or decreased to 3 or less depending on the type of camera module 10.

One of the plurality of lenses may be configured to be exposed to a front of the lens barrel 110 and the camera module 10. In an example, the forwardmost lens L1 may be disposed at the top of the lens barrel to easily capture an image of a subject.

The barrel holder 120 may be configured to be coupled to the lens barrel 110. For example, an accommodating space 122 that accommodates the lens barrel 110 may be formed inside the barrel holder 120. The barrel holder 120 may be configured to fix the lens barrel 110 to the housing 500. In an example, the barrel holder 120 may be coupled to the housing 500 via a flange portion 124, to fix a position of the lens barrel 110, relative to the housing 500. The barrel holder 120 may include a component that is coupled to, or in contact with, the first substrate 200. For example, a plurality of legs 126 configured to contact the first substrate 200 may be formed below the barrel holder 120.

The first substrate 200 may be coupled to the barrel holder 120. For example, the first substrate 200 may be coupled to the leg 126 of the barrel holder 120 with a separate fastening device. As a specific example, the first substrate 200 may be fixed to the legs 126 of the barrel holder 120 by a device, such as, but not limited to, a bolt or an adhesive. However, a coupling device between the first substrate 200 and the barrel holder 120 is not limited to a bolt and an adhesive.

An electronic component that is necessary for the operation of the camera module 10 may be mounted on the first substrate 200. For example, an image sensor 210 that converts an optical signal incident through lenses of the lens barrel 110 into an electrical signal may be mounted on the first substrate 200. However, the configuration of electronic components mounted or mounted on the first substrate 200 is not limited to the image sensor 210. For example, a passive element or a driving element to assist the driving of the image sensor 210 may be further mounted on the first substrate 200.

The first substrate 200 may include a component to be electrically connected to other components (e.g., a second substrate 300). For example, one or more first connection terminals 220 may be formed on one surface (for example, a bottom surface in FIG. 1) of the first substrate 200. The first connection terminal 220 may be electrically connected to the image sensor 210. For example, the first connection terminal 220 may be electrically connected to the image sensor 210 through a printed circuit formed disposed inside or on a surface of the first substrate 200. Accordingly, an electrical signal of the image sensor 210 may be transferred to the second substrate 300 through the first connection terminal 220.

The second substrate 300 may be disposed at a predetermined distance from the first substrate 200. For example, the second substrate 300 may be disposed to have a predetermined distance from one surface (i.e., the bottom surface) of the first substrate 200 so as not to interfere with electronic components mounted on an upper portion of the second substrate 300 or a bottom surface of the first substrate 200.

An electronic component, that may be necessary for driving the camera module 10, may be mounted on the second substrate 300. For example, a power supply unit 340, that supplies a current to drive the image sensor 210, may be mounted on a first surface or a second surface of the second substrate 300. However, an electronic component mounted on the second substrate 300 is not limited to the power supply unit 340. For example, a passive element, or the like, that may be necessary to drive the image sensor 210, may be further mounted on the second substrate 300.

The second substrate 300 may include a component to be electrically connected to the first substrate 200. For example, one or more second connection terminals 320 may be formed on one surface of the second substrate 300 (for example, the upper surface based on FIG. 1). The second connection terminal 320 may be electrically connected to the power supply unit 340 described above. For example, the second connection terminal 320 may be electrically connected to the power supply unit 340 through a printed circuit disposed inside or on a surface of the second substrate 300. Accordingly, current of the power supply unit 340 may be supplied externally through the second connection terminal 320.

A substrate connection member BC may be configured to electrically connect the first substrate 200 and the second substrate 300 to each other. In an example, the substrate connection member BC may be in contact with a first connection terminal 220 of the first substrate 200 and a second connection terminal 320 of the second connection terminal 320, respectively, to electrically connect the first substrate 200 and the second substrate 300. In a non-limited example, the substrate connection member BC may be fixed to the first substrate 200 or the second substrate 300. For example, one end of the substrate connection member BC may be fixed to the first connection terminal 220 of the first substrate 200 or to the second connection terminal 320 of the second substrate 300.

The housing 500 may be configured to accommodate important parts of the camera module 10. For example, a lens barrel 110, a barrel holder 120, a first substrate 200, and a third substrate 300 may be disposed in an accommodating space 510 of the housing 500. The lens barrel 110, the barrel holder 120, the first substrate 200, the substrate connection member BC, and the second substrate 300 may be sequentially disposed in the accommodating space 510 of the housing 500. In other words, the second substrate 300 may be disposed at a bottom area of the accommodating space 510, and may be disposed in an order of a first substrate 200, a barrel holder 120, and a lens barrel above the second substrate 300. The lens barrel 110, the barrel holder 120, the first substrate 200, and the second substrate 300 may be coupled or electrically connected to the accommodating space 510 of the housing 500 as they are sequentially stacked in the accommodating space 510 of the housing 500. For example, the first substrate 200, the substrate connection member BC, and the second substrate 300 may be stacked in the accommodating space 510 of the housing 500, and may be electrically connected to each other. Therefore, the camera module 10, in accordance with one or more embodiments, may not only omit a separate process of connecting the first substrate 100 and the second substrate 300, but may also omit or reduce a component for a flexible board that may be necessary to electrically connect the first substrate 200 and the second substrate 300 and a space to achieve bending deformation of the flexible board.

The cover member 700 may be configured to fix the lens barrel 110 to the barrel holder 120. For example, the cover member 700 may be coupled to the barrel holder 120 by methods such as, but not limited to, screw coupling, using an adhesive, or the like, to firmly fix the lens barrel 110 to the barrel holder 120.

The airtight members 810 and 820 may be configured to shield gaps between members of the camera module 10. For example, the first airtight member 810 may be configured to shield a gap between the lens barrel 110 and the cover member 700, and the second airtight member 820 may be configured to shield a gap between the lens barrel 110 and the barrel holder 120. For reference, although not illustrated in FIG. 1, a separate airtight member may be further disposed between the barrel holder 120 and the housing 500 as needed.

Figure 2:
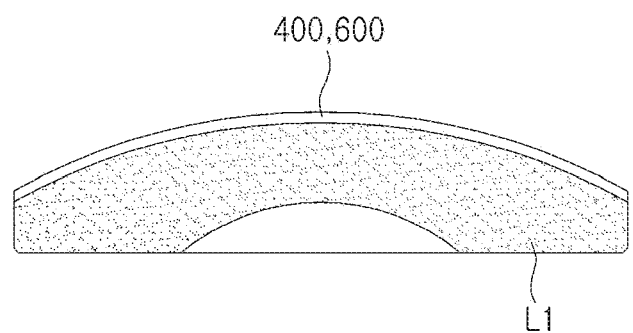
FIG. 2 illustrates a cross-sectional view of the forwardmost lens illustrated in FIG. 1.

The camera module 10 may be configured to remove elements or particles such as, but not limited to, frost, dirt, and the like that are formed or attached to a surface of the forwardmost lens L1. For example, the camera module 10, in accordance with one or more embodiments, may further include a heater 400 and a dirt remover 600 as illustrated in FIG. 2.

The heater 400 and the dirt remover 600 may be configured to effectively remove frost, dirt, and the like that is formed on, or attached to, the surface of the forwardmost lens L1. In an example, the heater 400 and the dirt remover 600 may be formed on an object-side surface (a side surface close to a subject) of the forwardmost lens L1, as illustrated in FIG. 2, to rapidly and accurately provide a driving force, that may be necessary to remove dirt.

The heater 400 and the dirt remover 600 may be configured so that they do not impair optical characteristics of the forwardmost lens L1. In an example, the heater 400 and the dirt remover 600 may be formed of a material that transmits light. As a specific example, the heater 400 and the dirt remover 600 may be formed of a transparent material or transparent electrode including Indium Tin Oxide (ITO). As another example, the heater 400 and the dirt remover 600 may be formed on the surface of the forwardmost lens L1 to have the same, or uniform, thickness. In other words, the heater 400 and the dirt remover 600 may be configured in a form having a radius of curvature substantially equal to a radius of curvature (on an object-side surface) of the forwardmost lens L1.

The example camera module 10, in accordance with one or more embodiments, may further include a component that suppresses the attachment of dirt, other than the heater 400 and the dirt remover 600.

Figure 3A:
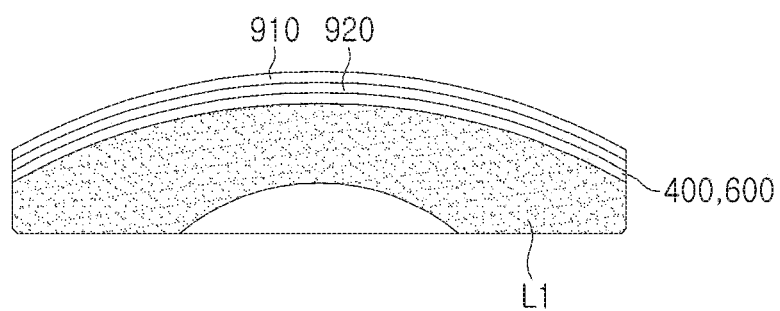
FIGS. 3A, 3B, and 3C illustrate cross-sectional views of modified examples of the forwardmost lens.
Figure 3B:
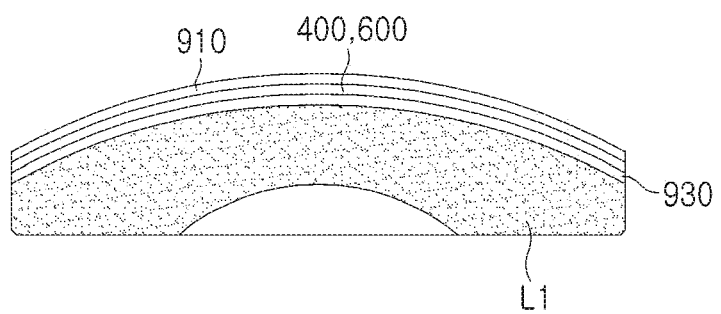
Figure 3C:
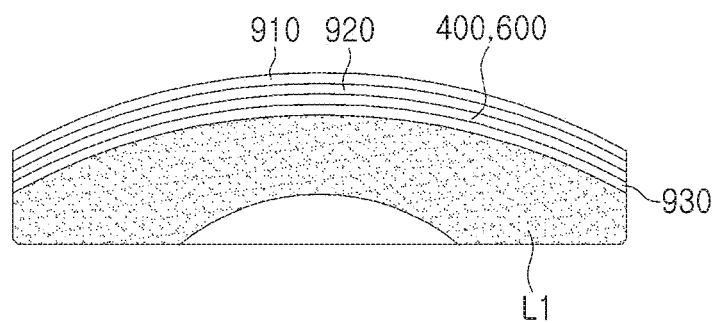

In an example, referring to FIG. 3A, the camera module 10 may further include a hydrophobic coating layer 910 formed on the forwardmost lens L1. The hydrophobic coating layer 910 may be formed on an outermost surface of the forwardmost lens L1. For example, the hydrophobic coating layer 910 may be formed to cover the heater 400 and the dirt remover 600. Since the hydrophobic coating layer 910 weakens the adhesion of dirt (including moisture) to the forwardmost lens L1, the removal efficiency of water droplets and dirt by the heater 400 and the dirt remover 600 may be increased.

The camera module 10, in accordance with one or more embodiments, may further include a component that minimizes deterioration in optical performance of the forwardmost lens L1 by the heater 400 and the dirt remover 600. For example, the camera module 10 may further include an anti-reflection layer 920 and a refractive index correction member 930 formed on the forwardmost lens L1 as illustrated in FIGS. 3A to 3O.

The anti-reflection layer 920 may be formed between the hydrophobic coating layer 910 and the surface of the forwardmost lens L1. However, a formation position of the anti-reflection layer 920 is not limited to the aforementioned position. For example, the anti-reflection layer 920 may also be formed on an image-side surface (inner side surface) of the forwardmost lens L1, The refractive index correction member 930 may be formed on a surface of the forwardmost lens L1. In a non-limited example, the refractive index correction member 930 may be formed between the heater 400 and the dirt remover 600, and the surface of the forwardmost lens L1. However, a formation position of the refractive index correction member 930 is not limited to the aforementioned position.

The anti-reflection layer 920 and the refractive index correction member 930 configured as above may suppress reflection and scattering of light by the heater 400 and the dirt remover 600, so that deterioration in optical performance of the camera module 10, which may be caused by the heater 400 and the dirt remover 600, may be reduced.

Figure 4:
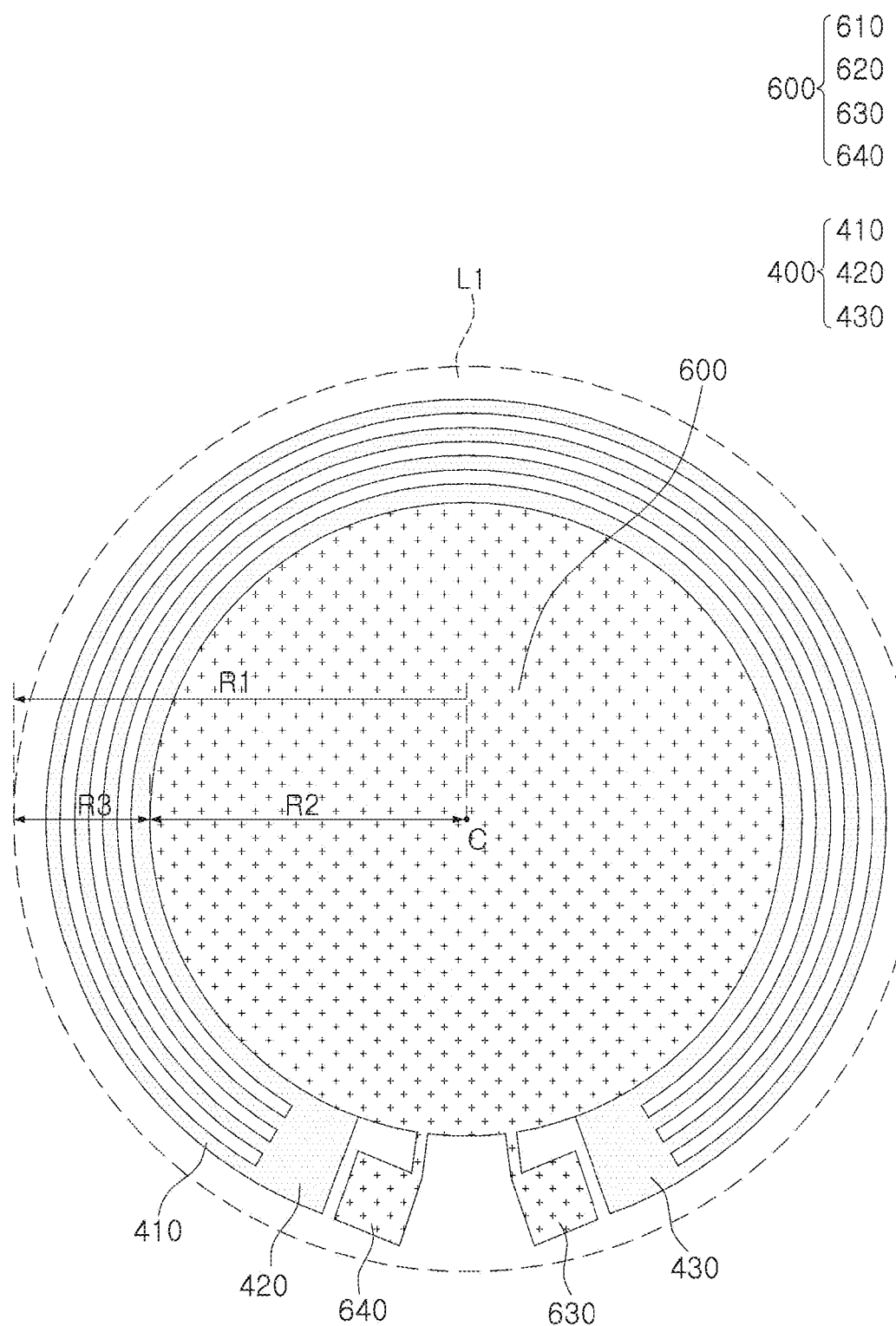
FIG. 4 illustrates a configuration diagram of an example heater and an example dirt remover formed on one surface of the forwardmost lens, in accordance with one or more embodiments.
Figure 5:
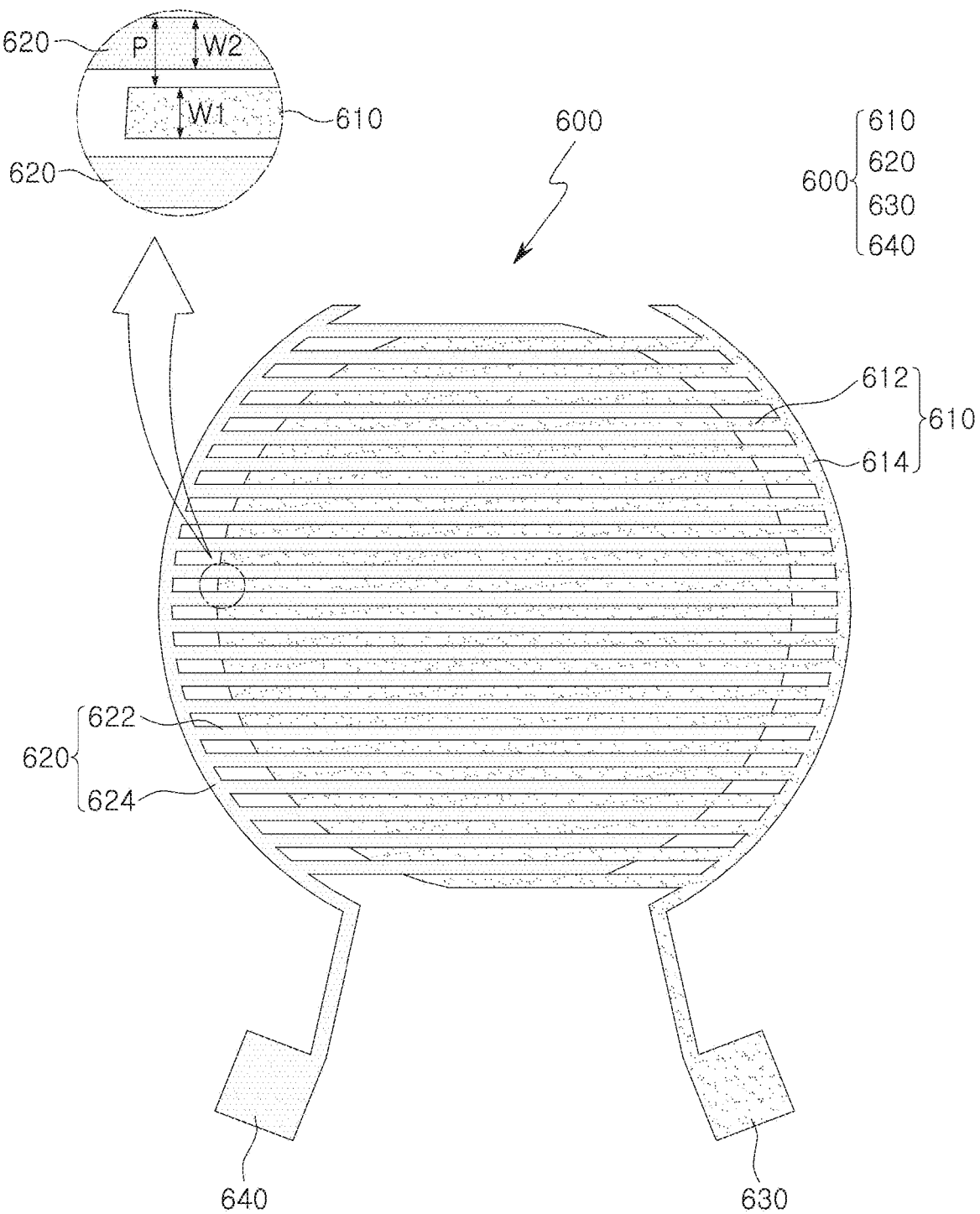
FIG. 5 illustrates an enlarged view of the example dirt remover illustrated in FIG. 4

Next, with reference to FIG. 4, a configuration of the heater 400 and the dirt remover 600 formed on the forwardmost lens L1 will be described in more detail.

The heater 400 and the dirt remover 600 may be formed in a shape, that is substantially the same, as or similar to, a cross-sectional shape of the forwardmost lens L1. In an example, the heater 400 and the dirt remover 600 may be disposed in a circular shape as a whole as illustrated in FIG. 4. However, a dispositional shape of the heater 400 and the dirt remover 600 is not limited to a circular shape. For example, the heater 400 and the dirt remover 600 may be formed in, as an example, a rectangular shape, similar to the shape of the image sensor, or may be formed in a polygonal shape such as a pentagon, hexagon, or octagon.

The heater 400 and the dirt remover 600 may be formed as a single layer. For example, a metal pattern or a metal pattern layer constituting the heater 400 and the dirt remover 600 may be integrally formed in a single process. Therefore, in the camera module, in accordance with one or more embodiments, the heater 400 and the dirt remover 600 may be formed as a single thin layer, and deterioration in resolution caused by the heater 400 and the dirt remover 600 may be minimized.

The heater 400 and the dirt remover 600 may be disposed so as not to overlap each other. For example, the heater 400 may be formed in an edge region of the forwardmost lens L1, and the dirt remover 600 may be formed in a paraxial region (a region including an optical axis) of the forwardmost lens L1. However, a position of the heater 400 and the dirt remover 600 are not limited to the above-described forms. For example, the heater 400 may be formed in the paraxial region of the forwardmost lens L1, and the dirt remover 600 may be formed in the edge region of the forwardmost lens L1, In an example, the heater 400 and the dirt remover 600 may be formed to have different sizes. In an example, a formation region of the dirt remover 600 may be larger than a formation region of the heater 400. In a non-limited example, the dirt remover 600 may be formed in a region of 60 to 90% of a total area (based on an outer surface) of the forwardmost lens L1, and, in a non-limited example, the heater 400 may be formed in a region of 10 to 40% of the total area (based on the outer surface) of the forwardmost lens L1. In a non-limited example, a ratio (R2/R1) between a radius R2 of a region where the dirt remover 600 is formed and a radius R1 of the forwardmost lens L1 may be 0.6 to 0.9, and a ratio (R3/R1) between a radial size R3 of a region in which the heater 400 is formed and the radius R1 of the forwardmost lens L1 may be 0.1 to 0.4.

The heater 400 may include a heating unit 410 and heating terminals 420 and 430. However, the components for the heater 400 are not limited to the heating unit 410 and the heating terminals 420 and 430. In an example, the heater 400 may further include an insulating member or an insulating layer to prevent electrical connection (short circuit) with the dirt remover 600.

In a non-limited example, the heating unit 410 may be formed in a circular shape in a circumferential direction of the forwardmost lens L1. However, the shape of the heating unit 410 is not limited to a circular shape. For example, the heating unit 410 may be formed in a waveform or zigzag shape surrounding an edge of the forwardmost lens L1. The heating unit 410 may be connected to the heating terminals 420 and 430. For example, a first end of the heating unit 410 may be connected to the heating terminal 420 and a second end of the heating unit 410 may be connected to the heating terminal 430. The heating unit 410 configured as described above may be heated by current supplied through the heating terminals 420 and 430 to evaporate water droplets, and similar elements or particles collected at the edge of the forwardmost lens L1.

The heating terminals 420 and 430 may be connected to the heating unit 410, and may be configured to supply current to the heating unit 410. The heating terminals 420 and 430 may be configured to be located on an edge or a flange portion of the forwardmost lens. For example, the heating terminals 420 and 430 may extend from an outermost point of the heating unit 410 in a direction, crossing the optical axis.

The dirt remover 600 may be configured to use an electrowetting phenomenon. For example, the dirt remover 600 may be configured to remove liquid droplets (or water droplets), foreign matter, and the like through a magnetic field formed between different electrodes. Accordingly, the dirt remover 600 may include a first electrode member 610 and a second electrode member 620.

The first electrode member 610 and the second electrode member 620 may be formed so as not to overlap each other. In an example, the plurality of second electrode members 620 may be alternately disposed in one direction crossing the optical axis of the forwardmost lens L1. In an example, the first electrode member 610 and the second electrode member 620 may have substantially the same size. For example, a width w1 of the first electrode member 610 and a width w2 of the second electrode member 620 may be formed to have the same size. The first electrode member 610 and the second electrode member 620 may be formed at a predetermined separation distance P. In an example, the distance P between the first electrode member 610 and the second electrode member 620 may be greater than the width w1 of the first electrode member 610 and the width w2 of the second electrode member 620, and may be smaller than or equal to the sum (w1+w2) of the width w1 of the first electrode member 610 and the width w2 of the second electrode member 620.

The first electrode member 610 and the second electrode member 620 may include extension portions 612 and 622, and connection portions 614 and 624. The extension portions 612 and 614 may extend in a direction crossing an optical axis of the forwardmost lens L1, and the connection portions 614 and 624 may be configured to be respectively connected to the plurality of extension portions 612 and 614 extending in a direction crossing the optical axis. In other words, the plurality of first extension portions 612 may be formed to extend from one side (right side in FIG. 5) of the forwardmost lens L1 to the other side thereof, and the first connection portion 614 may be formed in an arc shape along a circumferential direction of the forwardmost lens L1 to integrally connect one end of the first extension portion 612. Similarly thereto, the plurality of second extension portions 622 may be formed to extend from the other side (left side in FIG. 5) of the forwardmost lens L1 to one side thereof, and the second connection portion 624 may be formed in an arc shape in a circumferential direction, to integrally connect one end of the second extension portion 622.

The dirt remover 600 may further include a first terminal 630 and a second terminal 640 respectively connected to the first electrode member 610 and the second electrode member 620. The first terminal 630 may be integrally connected to the plurality of first electrode members 610, and the second terminal 640 may be integrally connected to the plurality of second electrode members 620. The first terminal 630 and the second terminal 640 may supply a voltage or current so that a magnetic field of a predetermined size is formed between the first electrode member 610 and the second electrode member 620. In a non-limited example, the first terminal 630 may be configured so that the first electrode member 610 has a positive polarity, and the second terminal 640 may be configured so that the second electrode member 620 has a negative polarity.

The dirt remover 600 configured as above may remove water droplets and other particles attached to a surface of the forwardmost lens L1 through a magnetic field formed between the first electrode member 610 and the second electrode member 620, or remove dirt such as surrounding dust, or the like, using water droplets attached to the surface thereof. For example, the dirt remover 600 may remove water droplets formed near a central portion of the forwardmost lens L1 through a magnetic force, and may push dirt such as dust around the forwardmost lens L1 to the outside of the forwardmost lens L1 by using water droplets or by sweeping the same off to the outside of the forwardmost lens Therefore, the camera module 10, in accordance with one or more embodiments, may always keep a surface (or an object side surface) of the forwardmost lens L1 clean based on operations of the heater 400 and the dirt remover 600.

Figure 6:
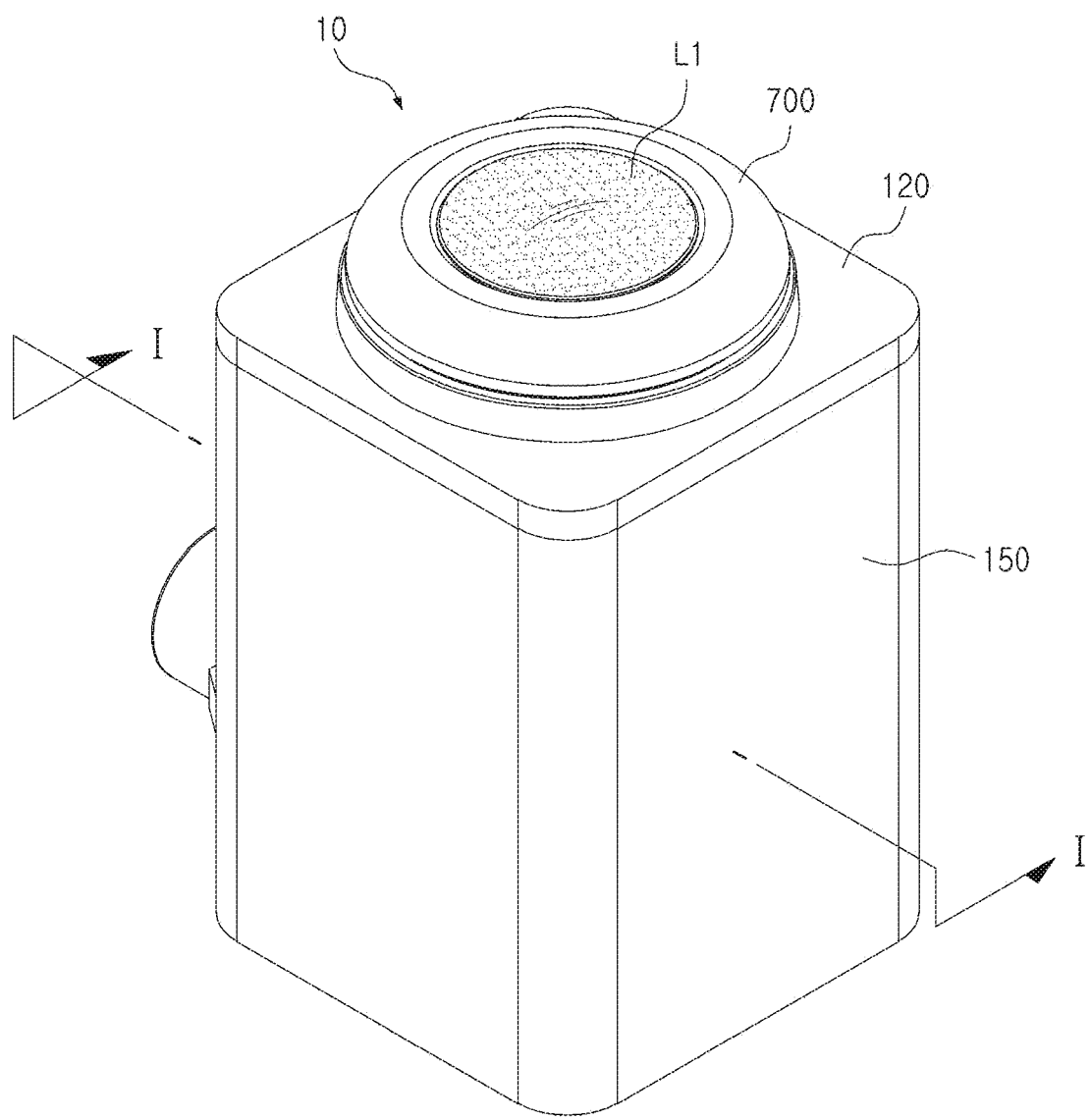
FIG. 6 illustrates a combined perspective view of the example camera module illustrated in FIG. 1.
Figure 7:
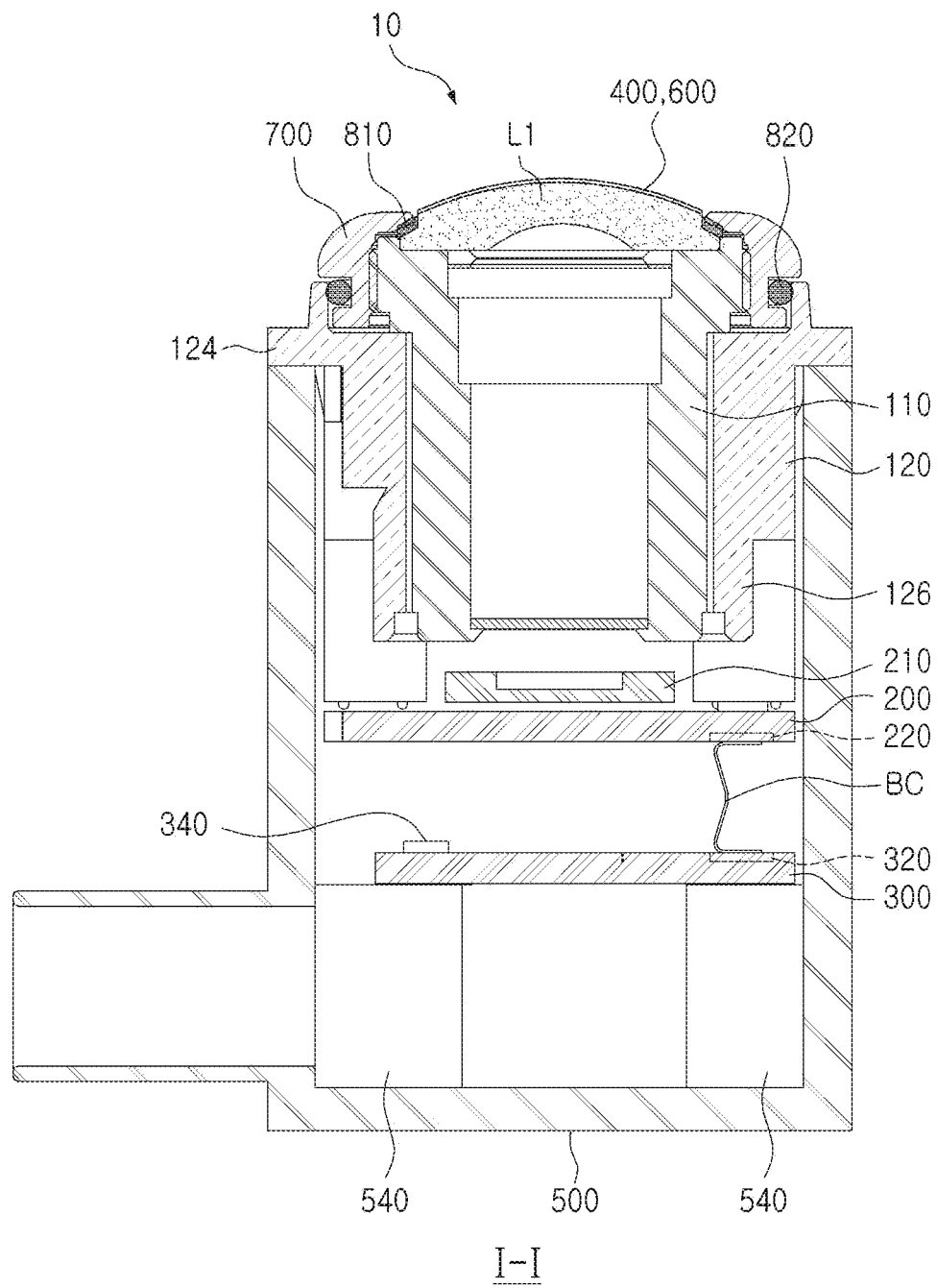
FIG. 7 illustrates a cross-sectional view of the camera module illustrated in FIG. 6.

As illustrated in FIGS. 6 and 7, the example camera module 10 configured as above may be configured in a form in which main parts of the camera module 10 are embedded inside the housing 500. Accordingly, the camera module 10, in accordance with one or more embodiments, may be installed in any place as long as the housing 500 may be accommodated therein.

Next, a camera module, in accordance with one or more embodiments, will be described with reference to FIGS. 8 to 14.

A camera module 12, in accordance with one or more embodiments, includes a lens barrel 110, a barrel holder 120, a first substrate 200, a second substrate 300, a housing 500, and a curved protective glass panel CG. However, the configuration of the camera module 12 is not limited to the members described above. For example, the camera module 12 may further include a cover member 700 and airtight members 810 and 820.

The lens barrel 110 may be configured to include one or more lenses L1. For example, the lens barrel 110 may include, as an example, four or more lenses sequentially disposed in an optical axis from an object side. However, the number of lenses accommodated in the lens barrel 110 is not limited to four. In an example, the number of lenses accommodated in the lens barrel 110 may be increased to five or more or decreased to three or less depending on the type of the camera module 12.

The barrel holder 120 may be configured to be coupled to the lens barrel 110. For example, an accommodating space that accommodates the lens barrel 110 may be formed inside the barrel holder 120. The barrel holder 120 may be configured to fix the lens barrel 110 to the housing 500. For example, the barrel holder 120 may be coupled to the housing 500 via a flange portion 124 to fix a position of the lens barrel 110 relative to the housing 500. The barrel holder 120 may include a component that is coupled to, or in contact with, the first substrate 200. For example, a plurality of legs 126 configured to contact the first substrate 200 may be formed below the barrel holder 120.

The first substrate 200 may be coupled to the barrel holder 120. For example, the first substrate 200 may be coupled to the legs 126 of the barrel holder 120 with a separate fastener.

As a specific example, the first substrate 200 may be fixed to the legs 126 of the barrel holder 120 by bolts or adhesives. However, a coupling method between the first substrate 200 and the barrel holder 120 is not limited to bolts and adhesives.

An electronic component, that may be necessary for the operation of the camera module 12, may be mounted on the first substrate 200. For example, an image sensor 210 that converts an optical signal incident through lenses of the lens barrel 110 into an electrical signal may be mounted on the first substrate 200. However, the configuration of electronic component mounted or mounted on the first substrate 200 is not limited to the image sensor 210. For example, a passive element or a driving element that assists the driving of the image sensor 210 may be further mounted on the first substrate 200.

The first substrate 200 may include a component that is electrically connected to other components (e.g., a second substrate 300). For example, one or more first connection terminals 220 may be formed on one surface (for example, a bottom surface based on FIG. 8) of the first substrate 200. The first connection terminal 220 may be electrically connected to an image sensor 210. For example, the first connection terminal 220 may be electrically connected to the image sensor 210 through a printed circuit formed inside, or on, a surface of the first substrate 200. Accordingly, an electrical signal of the image sensor 210 may be transferred to the second substrate 300 through the first connection terminal 220.

The second substrate 300 may be disposed at a predetermined distance from one surface (i.e., bottom surface) of the first substrate 200. For example, the second substrate 300 may be disposed at a predetermined distance from one surface (i.e., bottom surface) of the first substrate 200, so as not to interfere with electronic components mounted above the second substrate 300 or on the bottom surface of the first substrate 200.

An electronic component, that may be necessary to drive the camera module 12 may be mounted on the second substrate 300. For example, a power supply unit 340 to supply current necessary to drive the image sensor 210 may be mounted on a first surface or a second surface of the second substrate 300. However, an electronic component mounted on the second substrate 300 is not limited to the power supply unit 340. In an example, a passive element, or the like, that may be necessary to drive the image sensor 210 may be further mounted on the second substrate 300.

Figure 8:
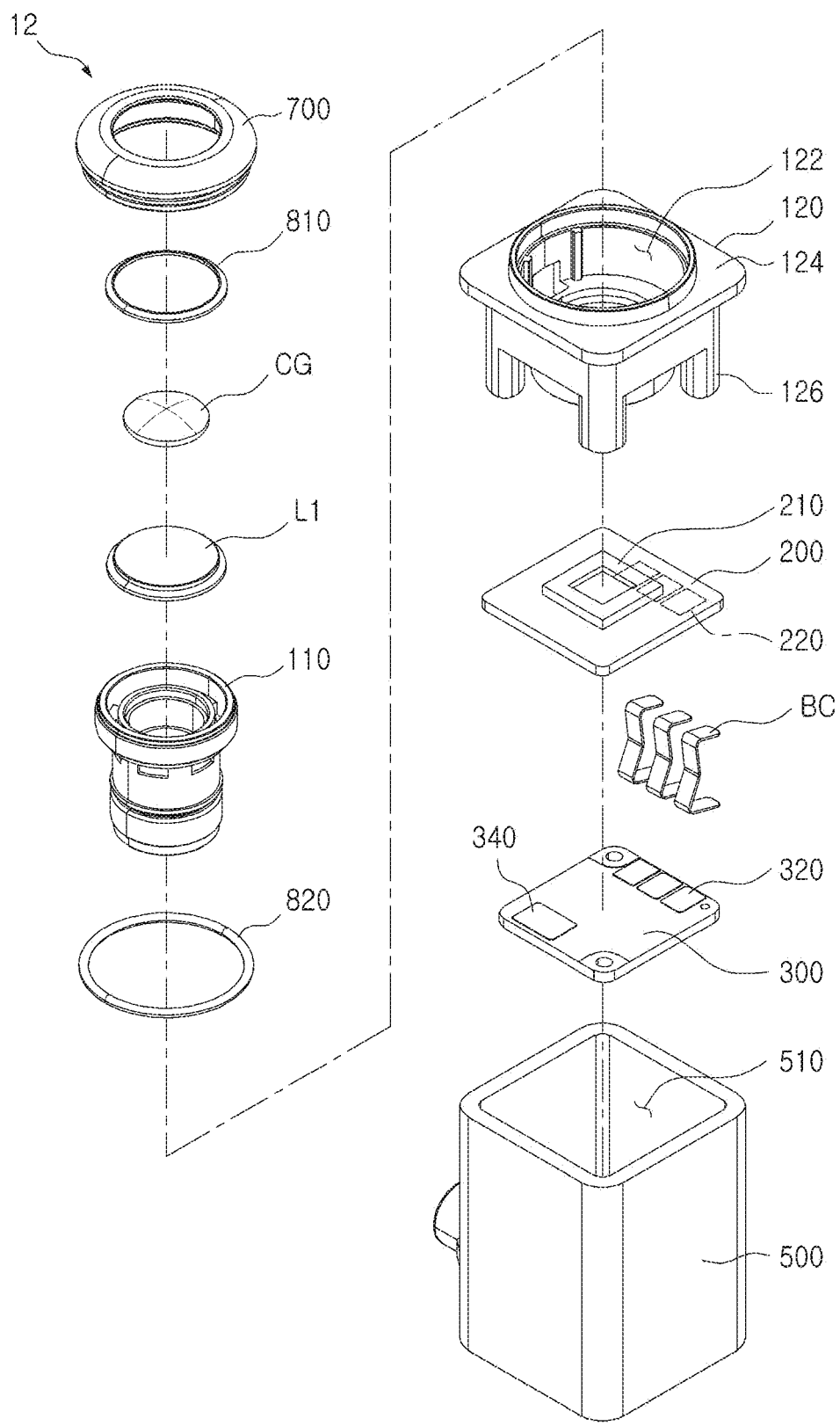
FIG. 8 illustrates an exploded perspective view of an example camera module, in accordance with one or more embodiments.

The second substrate 300 may include a component that is configured to be electrically connected to the first substrate 200. For example, one or more second connection terminals 320 may be formed on one surface of the second substrate 300 (for example, an upper surface as illustrated in FIG. 8). The second connection terminal 320 may be electrically connected to the power supply unit 340 described above. For example, the second connection terminal 320 may be electrically connected to the power supply unit 340 through a printed circuit formed inside or on a surface of the second substrate 300. Accordingly, the current of the power supply unit 340 may be supplied externally through the second connection terminal 320.

The substrate connection member BC may be configured to electrically connect the first substrate 200 and the second substrate 300 to each other. In other words, the substrate connection member BC may contact the first connection member 220 of the first substrate 200 and the second connection member 320 of the second substrate 300, respectively, to electrically connect the first substrate 200 and the second substrate 300. The substrate connection member BC may be fixed to the first substrate 200 or the second substrate 300. For example, one end of the board connection member BC may be fixed to the first connection terminal 220 of the first substrate 200 or may be fixed to the second connection terminal 320 of the second substrate 300.

The housing 500 may be configured to accommodate important parts of the camera module 12. For example, a lens barrel 110, a barrel holder 120, a first substrate 200, and a second substrate 300 may be disposed in an accommodating space 510 of the housing 500. The lens barrel 110, the barrel holder 120, the first substrate 200, the substrate connection member BC, and the second substrate 300 may be sequentially disposed in the accommodating space 510 of the housing 500. In other words, the second substrate 300 may be disposed at a bottom of the accommodating space 510, and may be disposed in an order of the first substrate 200, the barrel holder 120, and the lens barrel 110 thereabove. The lens barrel 110, the barrel holder 120, the first substrate 200, and the second substrate 300 may be coupled or electrically connected as they are sequentially stacked in the accommodating space 510 of the housing 500. For example, the first substrate 200, the board connecting member BC, and the second substrate 300 may be stacked in the accommodating space 510 of the housing 500 and electrically connected to each other simultaneously. Therefore, in the example camera module 12, a separate process connecting the first substrate 200 and the second substrate 300 may be omitted, and a configuration of a flexible board, that may be necessary to electrically connect the first substrate 200 and the second substrate 300 and a space to achieve bending deformation of the flexible board may also be omitted or reduced.

The cover member 700 may be configured to fix the lens barrel 110 to the barrel holder 120. For example, the lens barrel 110 may be coupled to the barrel holder 120 by methods such as, but not limited to, screwing, using an adhesive, or similar methods, to firmly fix the lens barrel 110 to the barrel holder 120.

The airtight members 810 and 820 may be configured to shield gaps between members of the camera module 12. For example, the first airtight member 810 may be configured to shield a gap between the lens barrel 110 and the cover member 700, and the second airtight member 820 may be configured to shield a gap between the lens barrel 110 and the barrel holder 120. For reference, although not shown in FIG. 1, a separate airtight member may be further disposed between the barrel holder 120 and the housing 500 as needed.

The protective glass panel CG may be configured to protect the forwardmost lens L1 from external impacts. For example, the protective glass panel CG may be disposed in front (object side) of the forwardmost lens L1 to block direct contact between an external material and the forwardmost lens.

The protective glass panel CG may be configured so that it does not impair the optical performance of the forwardmost lens L1. For example, the protective glass panel CG may have a radius of curvature, substantially the same as, or similar to, a radius of curvature of the object-side surface of the forwardmost lens L1. However, the protective glass panel CG may not have refractive power.

Figure 9:
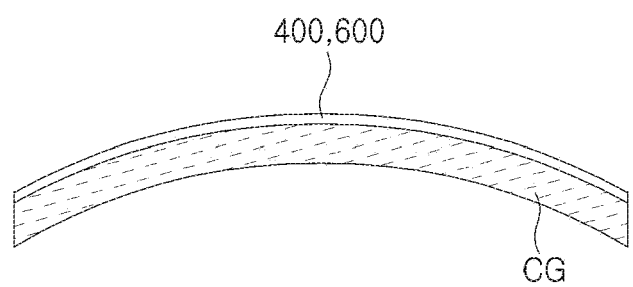
FIG. 9 illustrates a cross-sectional view of the protective glass panel illustrated in FIG. 8.

The camera module 12 may be configured to remove frost, dirt, and the like, formed or attached to a surface of the curved protective glass panel CG. For example, the camera module 12, in accordance with one or more embodiments, may further include a heater 400 and a dirt remover 600 as illustrated in FIG. 9.

The heater 400 and the dirt remover 600 may be configured to effectively remove frost, dirt, and the like, that is formed or attached to one surface (a surface) of the protective glass panel CG. For example, the heater 400 and the dirt remover 600 may be formed on one surface of the protective glass panel CG as shown in FIG. 9, to rapidly and accurately provide a driving force, that is necessary to remove the dirt.

The heater 400 and the dirt remover 600 may be configured so that they do not impair an optical performance of the camera module 12. For example, the heater 400 and the dirt remover 600 may be formed of a material that transmits light. As a specific example, the heater 400 and the dirt remover 600 may be formed of a transparent material or transparent electrode including ITO. As another example, the heater 400 and the dirt remover 600 may be formed on the surface of the protective glass panel CG to have the same thickness. In other words, the heater 400 and the dirt remover 600 may be configured in a form having substantially the same radius of curvature as the radius of curvature of the protective glass panel CG.

Figure 10A:
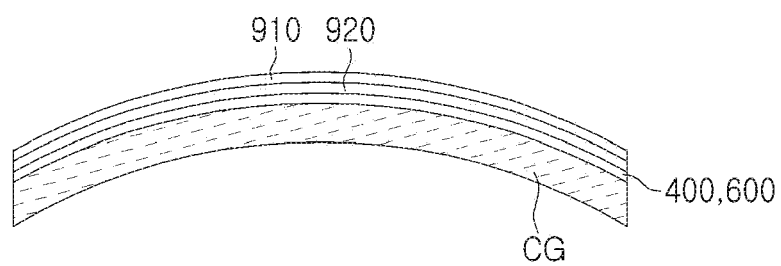
FIGS. 10A, 10B, and 10C illustrate cross-sectional views of modified examples of protective glass panel.
Figure 10B:
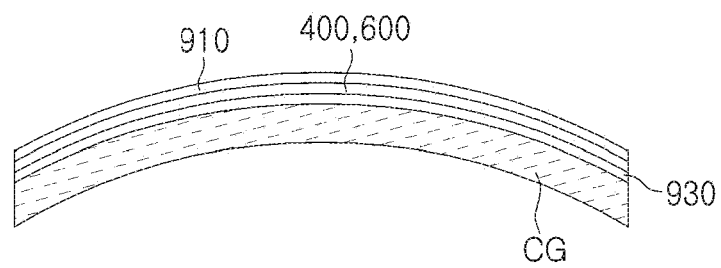
Figure 10C:
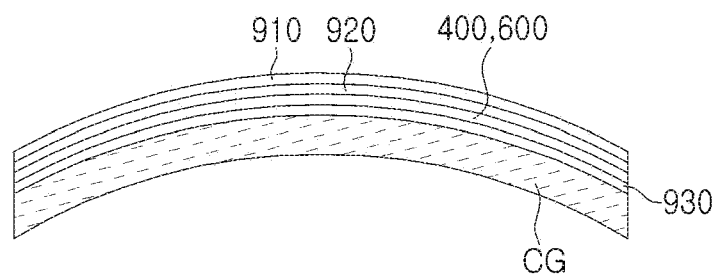

The camera module 12 according to the present embodiment may further include a component to suppress the attachment of dirt other than the dirt remover 600. For example, the camera module 12 may further include a hydrophobic coating layer 910 formed on the protective glass panel CG as shown in FIG. 10A. In an example, the hydrophobic coating layer 910 may be formed on an outermost surface of the protective glass panel CG. For example, the hydrophobic coating layer 910 may be formed to cover the heater 400 and the dirt remover 600. Since the hydrophobic coating layer 910 weakens the adhesion of dirt (including moisture) to the protective glass panel CG, the removal efficiency of water droplets and dirt by the heating unit 400 and the dirt remover 600 may be increased.

The camera module 12, in accordance with one or more embodiments, may further include a configuration that minimizes deterioration in optical performance of the camera module 12 by the heater 400 and the dirt remover 600. For example, the camera module 12 may further include an anti-reflection layer 920 and a refractive index correction member 930 formed on the protective glass panel CG as shown in FIGS. 10A to 10O.

The anti-reflection layer 920 may be formed between the hydrophobic coating layer 910 and the surface of the protective glass panel CG. However, a formation position of the anti-reflection layer 920 is not limited to the aforementioned position. For example, the anti-reflection layer 920 may be formed on an inner side surface of the protective glass panel CG.

The refractive index correction member 930 may be formed on the surface of the protective glass panel CG. In an example, the refractive index correction member 930 may be formed between the heater 400 and the dirt remover 600, and the protective glass panel CG. However, a formation position of the refractive index correction member 930 is not limited to the aforementioned position.

The anti-reflection layer 920 and the refractive index correction member 930 configured as above suppress the reflection and scattering of light by the heater 400 and the dirt remover 600, to reduce deterioration in the optical performance of the camera module 12, which may be caused by the heater 400 and the dirt remover 600.

Next, with reference to FIG. 11, configurations of the heater 400 and the dirt remover 600 formed on the forwardmost lens L1 will be described in more detail.

The heater 400 and the dirt remover 600 may be formed in substantially the same or similar cross-sectional forms of the protective glass panel CG. For example, the heater 400 and the dirt remover 600 may be disposed in a circular shape as a whole as illustrated in FIG. 11. However, a dispositional form of the heater 400 and the dirt remover 600 is not limited to a circular shape. In an example, the heater 400 and the dirt remover 600 may be formed in a rectangular shape, similar to the shape of the image sensor, or may be formed in a polygonal shape such as, as examples, a pentagon, hexagon, or octagon.

The heater 400 and the dirt remover 600 may be formed as a single layer. For example, a metal pattern or metal pattern layer constituting the heater 400 and the dirt remover 600 may be integrally formed by a single process. Therefore, in the example camera module, the heater 400 and the dirt remover 600 may be formed as a single thin layer, and deterioration in resolution caused by the heater 400 and the dirt remover 600 may be minimized.

The heater 400 and the dirt remover 600 may be disposed so as not to overlap each other. For example, the heater 400 may be formed in an edge region of the protective glass panel CG, and the dirt remover 600 may be formed in a paraxial region of the protective glass panel CG. However, the positions of the heater 400 and the dirt remover 600 are not limited to the above-described forms. For example, the heater 400 may be formed in a paraxial region of the protective glass panel CG, and the dirt remover 600 may also be formed in an edge region of the protective glass panel CG.

The heater 400 and the dirt remover 600 may be formed to have different sizes.

For example, a formation region of the dirt remover 600 may be greater than a formation region of the heater 400. In a non-limited example, the dirt remover 600 may be formed in a region of 60 to 90% of a total area (based on an outer surface) of the protective glass panel CG, and the heater 400 may be formed in a region of 10 to 40% of the total area (based on an outer surface) of the protective glass panel CG. In a non-limited example, a ratio (R2/R1) between a radius R2 of a region where the dirt remover 600 is formed and a radius R1 of the protective glass panel CG may be 0.6 to 0.9, and a ratio (R3/R1) between a radial size R3 of a region where the heater 400 is formed and the radius R1 of the protective film CG may be a 1 to 0.4.

Figure 11:
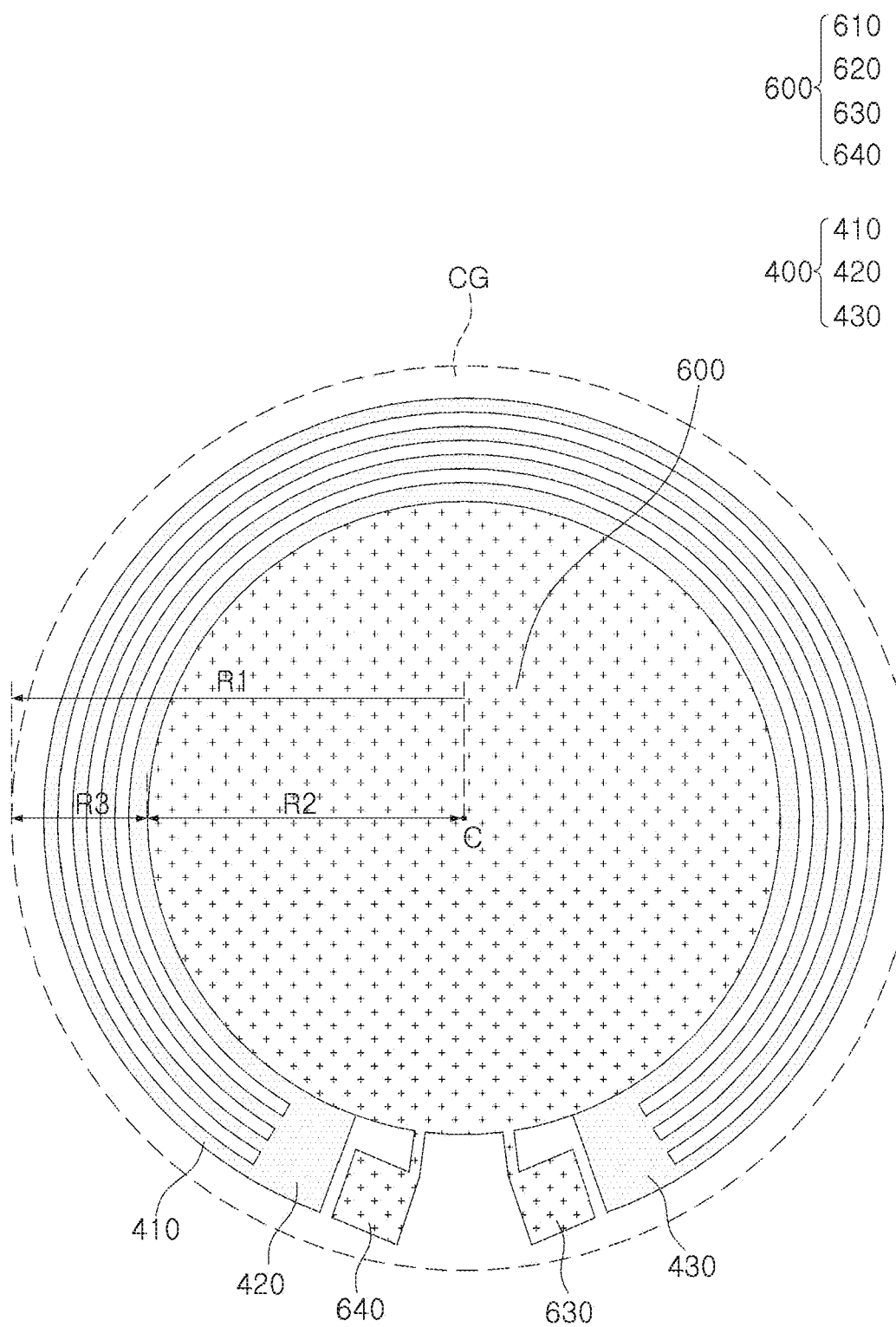
FIG. 11 illustrates a configuration diagram of an example heater and an example dirt remover formed on one surface of a protective glass panel, in accordance with one or more embodiments.
Figure 12:
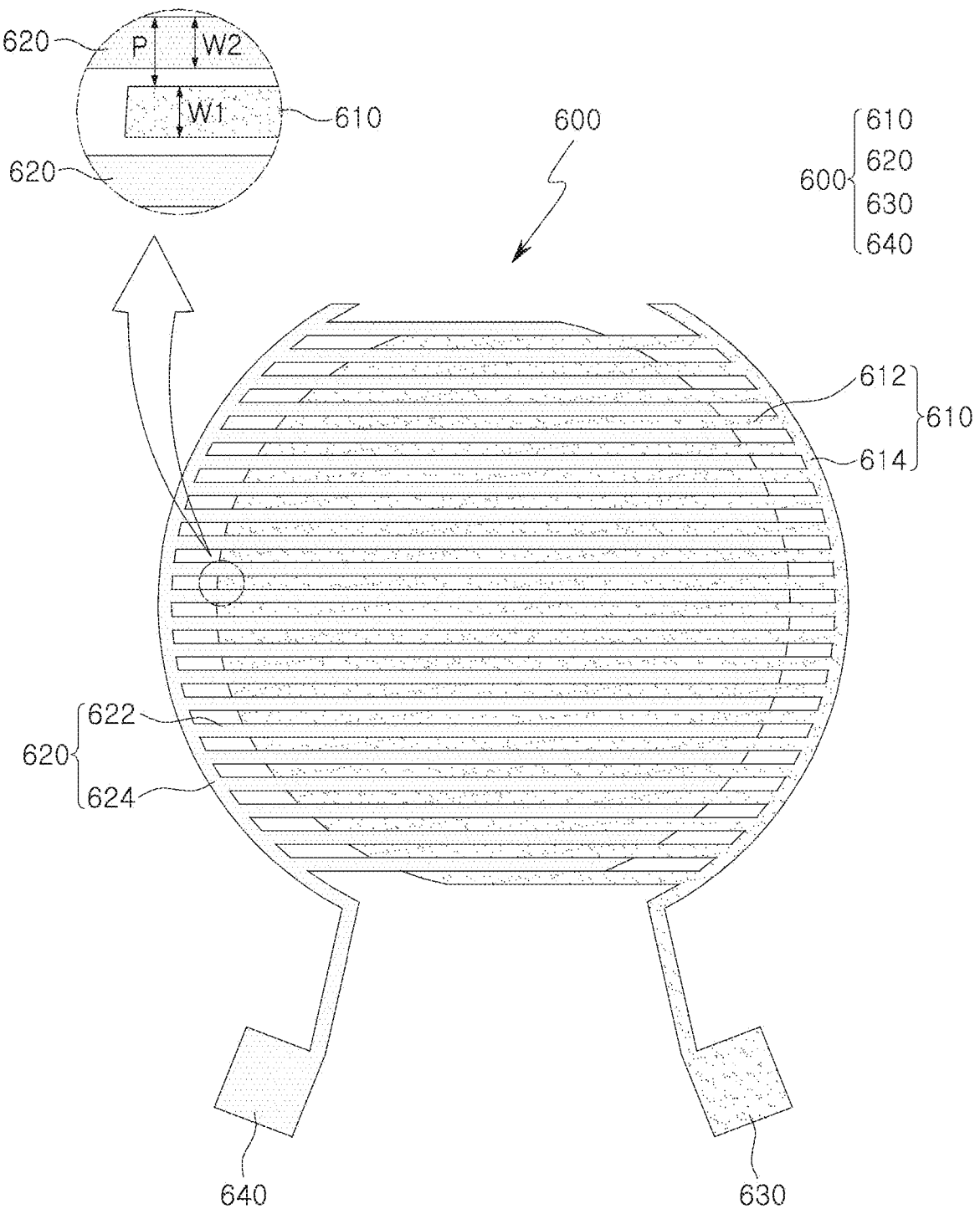
FIG. 12 illustrates an enlarged view of the example dirt remover of FIG. 11.

Referring to FIG. 11, the heater 400 may include a heating unit 410 and heating terminals 420 and 430. However, the components of the heater 400 are not limited to the heating unit 410 and the heating terminals 420 and 430. For example, the heater 400 may further include an insulating member or an insulating layer for preventing electrical connection (short circuit) with the dirt remover 600.

In an example, the heating unit 410 may be formed in a circular shape in a circumferential direction of the curved protective glass panel CG. However, a shape of the heating unit 410 is not limited to a circular shape. In an example, the heating unit 410 may be formed in a waveform or zigzag shape surrounding an edge of the protective glass panel CG. The heating unit 410 may be connected to heating terminals 420 and 430. In an example, a first end of the heating unit 410 may be connected to the heating terminal 420, and a second end of the heating unit 410 may be connected to the heating terminal 430. The heating unit 410 configured as described above may generate heat based on a current supplied through the heating terminals 420 and 430 to evaporate water droplets condensed on the edge of the protective glass panel CG, The heating terminals 420 and 430 may be connected to the heating unit 410, and may be configured to supply current to the heating unit 410. The heating terminals 420 and 430 may be configured to be located on the edge or a flange portion of the protective glass panel CG. For example, the heating terminals 420 and 430 may extend from an outermost point of the heating unit 410 in a direction intersecting an optical axis.

The dirt remover 600 may be configured to use an electrowetting phenomenon. For example, the dirt remover 600 may be configured to remove liquid droplets (or water droplets), foreign matter, and the like based on a magnetic field that is formed between different electrodes. Accordingly, the dirt remover 600 may include a first electrode member 610 and a second electrode member 620.

The first electrode member 610 and the second electrode member 620 may be formed so as not to overlap each other. For example, the plurality of second electrode members 620 may be alternately disposed in one direction intersecting the optical axis of the protective glass panel CG. In an example, the first electrode member 610 and the second electrode member 620 may have substantially the same size. For example, a width w1 of the first electrode member 610 and a width w2 of the second electrode member 620 may be formed to have the same size. The first electrode member 610 and the second electrode member 620 may be formed at a predetermined separation distance P. For example, the separation distance P between the first electrode member 610 and the second electrode member 620 may be greater than the width w1 of the first electrode member 610 and the width w2 of the second electrode member 620, and may be smaller than or equal to the sum (w1+w2) of the width w1 of the first electrode member 610 and the width w2 of the second electrode member 620.

The first electrode member 610 and the second electrode member 620 may include extension portions 612 and 622 and connection portions 614 and 624. The extension portions 612 and 614 extend in a direction, intersecting an optical axis C of the protective glass panel CG, and the connection portions 614 and 624 may be configured to be connected to the plurality of extension portions 612 and 614 extending in a direction, intersecting the optical axis, respectively. In other words, the plurality of first extension portions 612 may be formed to extend from one side (for example, the right side in FIG. 12) of the protective glass panel CG to the other side thereof, and the first connection portion 614 may be formed in an arc shape in a circumferential direction of the protective glass panel CG, to integrally connect one end of the first extension portion 612. Similarly thereto, the plurality of second extension portions 622 may be formed to extend from the other side (for example, the left side in FIG. 12) of the protective glass panel CG to one side thereof, and the second connection portion 624 may be formed in an arc shape in a circumferential direction of the forwardmost lens L1 to integrally connect one end of the second extension portion 622.

The dirt remover 600 may further include a first terminal 630 and a second terminal 640 respectively connected to the first electrode member 610 and the second electrode member 620. The first terminal 630 may be integrally connected to the plurality of first electrode members 610 and the second terminal 640 may be integrally connected to the plurality of second electrode members 620. The first terminal 630 and the second terminal 640 may supply a voltage or current so that a magnetic field of a predetermined size is formed between the first electrode member 610 and the second electrode member 620. For example, the first terminal 630 may be configured so that the first electrode member 610 has a positive polarity, and the second terminal 640 may be configured so that the second electrode member 620 has negative polarity.

The dirt remover 600 configured as above may remove water droplets attached to a surface of the protective glass panel CG based on a magnetic field that is formed between the first electrode member 610 and the second electrode member 620, or remove dirt such as surrounding dust, or the like, using the water droplets attached to the surface thereof. For example, the dirt remover 600 may remove water droplets formed near a central portion of the protective glass panel CG based on a magnetic force, and may push dirt around the protective glass panel to the outside of the protective glass panel using water droplets, and may sweep the dirt off to the outside of the surface of the protective glass panel CG.

Therefore, the camera module 12, in accordance with one or more embodiments, may always keep the surface of the protective glass panel CG clean based on the heater 400 and the dirt remover 600.

Figure 13:
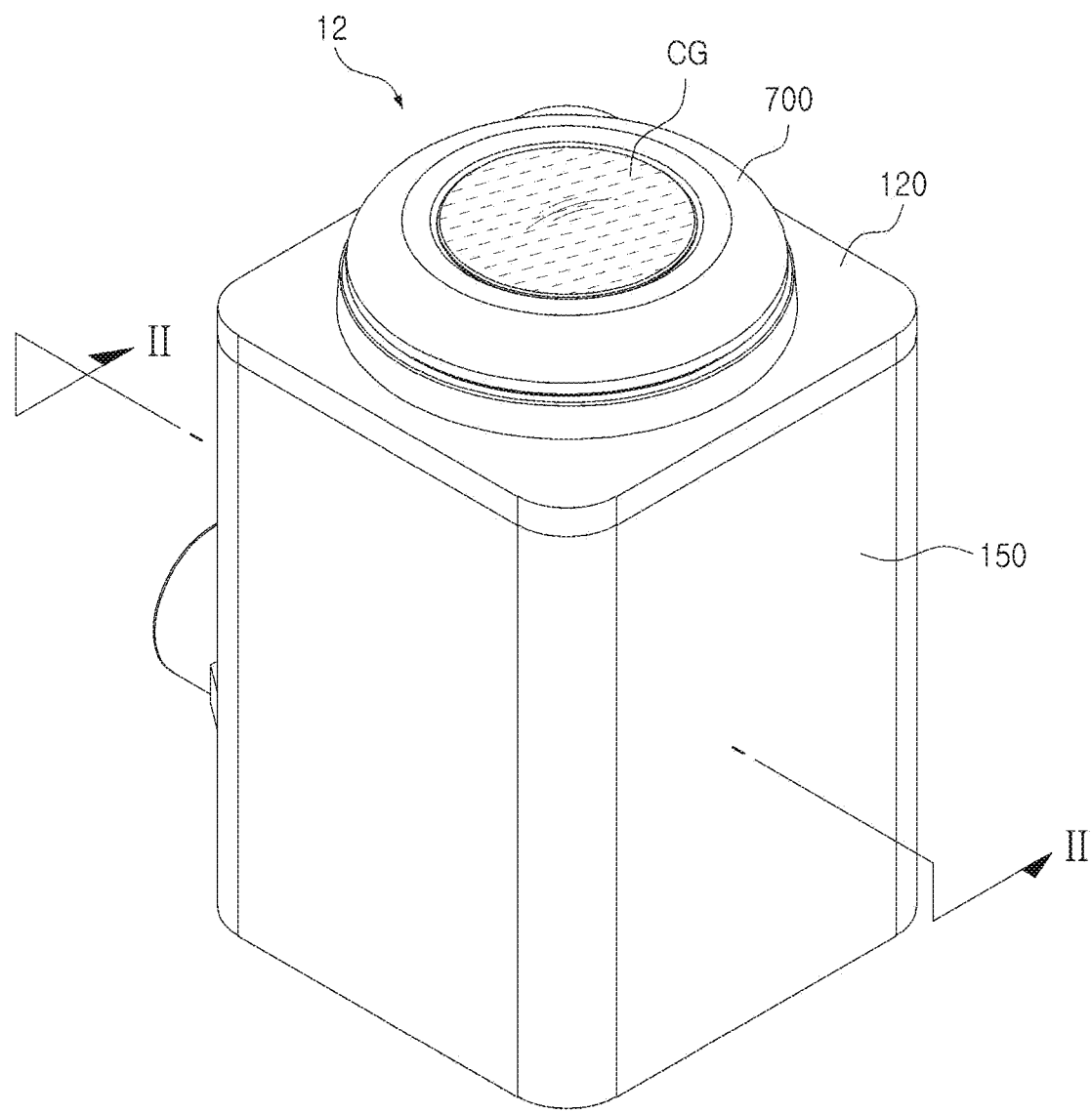
FIG. 13 illustrates a combined perspective view of the example camera module illustrated in FIG. 8.
Figure 14:
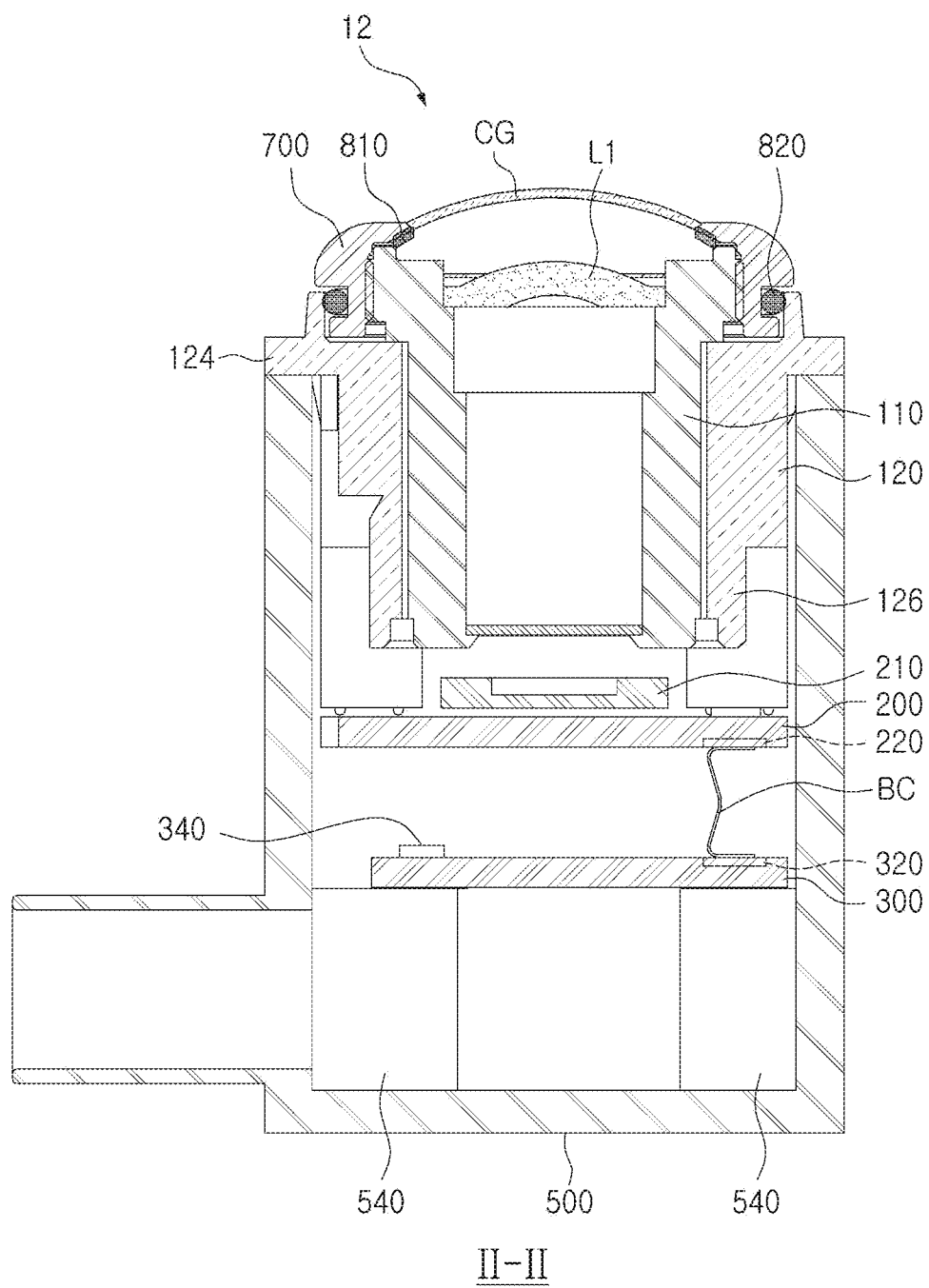
FIG. 14 illustrates a cross-sectional view of the example camera module illustrated in FIG. 13.

As illustrated in FIGS. 13 and 14, the example camera module 12 configured as described above may be configured in a form in which main parts of the camera module 12 are built in the housing 500. Accordingly, the example camera module 12 may be installed in any place as long as the housing 500 may be accommodated therein.

Additionally, in the example camera module 12, as illustrated in FIG. 14, a heater 400 and a dirt remover 600 may be formed on a surface of the protective glass panel CG, so that a phenomenon in which water droplets, dirt, and the like, are attached to the forwardmost lens may be reduced or suppressed. Thus, the imaging and imaging performance of the camera module 12 may be constantly maintained regardless of the surrounding environment.

As set forth above, in accordance with one or more embodiments, a phenomenon in which resolution of a camera module is deteriorated due to dirt, frost, water droplets, and the like, which hinder a front view of the lens module, may be reduced.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a lens module comprising a forwardmost lens;
a housing configured to accommodate the lens module;
a heater formed on the forwardmost lens, and configured to heat the forwardmost lens based on a first driving signal; and
a dirt remover formed on the forwardmost lens, and configured to generate at least one of electrical vibrations, mechanical vibrations, and a voltage difference to remove particles attached to a surface of the forwardmost lens based on a second driving signal,
wherein the heater and the dirt remover are formed as a single electrode pattern layer on the surface of the forwardmost lens.

2. The camera module of claim 1, wherein the forwardmost lens is a lens that is disposed closest to an object.

3. The camera module of claim 1, wherein the heater is formed in an edge region of the forwardmost lens, and
wherein the dirt remover is formed in a paraxial region of the forwardmost lens.

4. The camera module of claim 1, wherein the heater comprises,
a heating unit formed in an edge region of the forwardmost lens; and
a heating terminal connected to the heating unit.

5. The camera module of claim 1, wherein the dirt remover comprises:
a first electrode member which extends in a first direction, intersecting an optical axis of the forwardmost lens;
a second electrode member formed to be parallel to the first electrode member;
a first terminal connected to a first end of the first electrode member; and
a second terminal connected to a first end of the second electrode member.

6. The camera module of claim 5, wherein the first electrode member and the second electrode member are alternately disposed in a second direction, intersecting the optical axis.

7. The camera module of claim 1, wherein the heater and the dirt remover are formed on an object-side surface of the forwardmost lens.

8. The camera module of claim 1, further comprising:
a hydrophobic coating layer formed on a surface of the forwardmost lens.

9. The camera module of claim 1, further comprising:
an anti-reflection layer formed on a surface of the forwardmost lens.

10. The camera module of claim 1, further comprising:
a refractive index correction member formed on a surface of the forwardmost lens, and configured to correct a change in transmittance and a change in reflectance of light caused by the heater and the dirt remover.

11. The camera module of claim 1, wherein the heater is formed in a region having a size of 10% to 40% of a total area, based on an outer surface, of the forwardmost lens, and
wherein the dirt remover is formed in a region having a size of 60% to 90% of the total area.

12. A camera module, comprising:
a lens module;

a curved protective glass panel disposed on an object-side surface of the lens module;

a heater formed on the protective glass panel, and configured to heat the protective glass panel based on a first driving signal; and a dirt remover formed on the protective glass panel, and configured to generate at least one of electrical vibrations, mechanical vibrations, and a voltage difference to remove particles attached to a surface of the protective glass panel based on a second driving signal.

13. The camera module of claim 12, wherein the heater and the dirt remover are formed on one surface of the protective glass panel.

14. The camera module of claim 12, further comprising:
a hydrophobic coating layer formed on the surface of the protective glass panel.

15. The camera module of claim 12, further comprising:
an anti-reflection layer formed on the surface of the protective glass panel.

16. The camera module of claim 12, further comprising:
a refractive index correction member formed on the surface of the protective glass panel, and configured to correct a change in transmittance of light caused by the heater and the dirt remover.

17. A camera module, comprising:
a lens module, comprising a plurality of lens;
a transparent electrode disposed on an object-side surface of a forwardmost lens of the plurality of lens;
a hydrophobic coating layer formed on the object-side surface of the forwardmost lens; and
a refractive index correction member disposed adjacent to the transparent electrode;
wherein the transparent electrode comprises a heater and a dirt remover, and
wherein a formation region of the dirt remover is greater than a formation region of the heater.

18. The camera module of claim 17, wherein the transparent electrode includes Indium Tin Oxide (ITO).

19. The camera module of claim 17, further comprising an anti-reflection layer disposed between the transparent electrode and the hydrophobic coating layer.

* * * * *